(12) United States Patent
Baggenstoss (10) Patent No.: US 6,466,908 B1
(45) Date of Patent: Oct. 15, 2002

(54) SYSTEM AND METHOD FOR TRAINING A CLASS-SPECIFIC HIDDEN MARKOV MODEL USING A MODIFIED BAUM-WELCH ALGORITHM

(75) Inventor: Paul M. Baggenstoss, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/484,132

(22) Filed: Jan. 14, 2000

(51) Int. Cl.$^7$ ............................................... G10L 15/14
(52) U.S. Cl. ...................................... 704/256; 704/240
(58) Field of Search ................................ 704/256, 255, 704/251, 240, 239, 200, 231, 232

(56) References Cited

U.S. PATENT DOCUMENTS

| | | | | |
|---|---|---|---|---|
| 4,817,156 A | * | 3/1989 | Bahl et al. ................... | 704/244 |
| 5,864,810 A | * | 1/1999 | Digalakis et al. ........... | 704/254 |
| 5,963,906 A | * | 10/1999 | Turin .......................... | 704/232 |
| 6,055,498 A | * | 4/2000 | Neumeyer et al. .......... | 434/185 |
| 6,112,021 A | * | 8/2000 | Brand ......................... | 382/224 |
| 6,226,611 B1 | * | 5/2001 | Neumeyer et al. .......... | 434/185 |

OTHER PUBLICATIONS

IEEE Signal Processing Letters, vol.: 4. Iyer et al., "Using out-of-domain data to improve in-domain language models" pp. 221–223 vol.: 4 Issue: 8, Aug. 1997.*

* cited by examiner

*Primary Examiner*—Richemond Dorvil
(74) *Attorney, Agent, or Firm*—Michael J. McGowan; James M. Kasischke; Michael F. Oglo (57) ABSTRACT

A system and method for training a class-specific hidden Markov model (HMM) is used for modeling physical phenomena, such as speech, characterized by a finite number of states. The method receives training data and estimates parameters of the class-specific HMM from the training data using a modified Baum-Welch algorithm, which uses likelihood ratios with respect to a common state (e.g., noise) and based on sufficient statistics for each state. The parameters are stored for use in processing signals representing the physical phenomena, for example, in speech processing applications. The modified Baum-Welch algorithm is an iterative algorithm including class-specific forward and backward procedures and HMM reestimation formulas.

11 Claims, 5 Drawing Sheets

SYSTEM AND METHOD FOR TRAINING A CLASS-SPECIFIC HIDDEN MARKOV MODEL USING A MODIFIED BAUM-WELCH ALGORITHM

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

(1) Field of the Invention

This invention relates to systems and methods for modeling physical phenomena, and more particularly to a system and method for modeling physical phenomena, such as speech, using a class-specific implementation of the Baum-Welch algorithm for estimating the parameters of a class-specific hidden Markov model (HMM).

(2) Description of the Prior Art

By way of example of the state of the art, reference is made to the following papers, which are incorporated herein by reference. Not all of these references may be deemed to be relevant prior art.

P. M. Baggenstoss, "Class-specific features in classification," *IEEE Trans. Signal Processing*, December 1999.

S. Kay, "Sufficiency, classification, and the class-specific feature theorem," to be published IEEE Trans Information Theory.

B. H. Juang, "Maximum likelihood estimation for mixture multivariate stochastic observations of Markov chains," *AT&T Technical Journal*, vol. 64, no. 6, pp. 1235–1249, 1985.

L. R. Rabiner, "A tutorial on hidden Markov models and selected applications in speech recognition," *Proceedings of the IEEE*, vol. 77, pp. 257–286, February 1989.

L. E. Baum, "A maximization technique occurring in the statistical analysis of probabilistic functions of Markov chains," *Ann. Math. Stat.*, vol. 41, pp. 164–171, 1970.

E. H. Lehmann, Theory of Point Estimation, New York: Wiley, 1983.

S. Kay, Modern Spectral Estimation; *Theory and Applications*. Prentice Hall, 1988.

E. J. Hannan, *Multiple Time Series*, Wiley, 1970.

M. H. Quenouille, "The joint distribution of serial correlation coefficients," *Ann. Math. Stat.*, vol. 20, pp. 561–571, 1949.

Many systems, e.g., communication, data processing and other information systems, can be described or characterized in terms of a series of transitions through a set of states. Hidden Markov models (HMMs) have found applications in modeling physical phenomena characterized by a finite number of states. Often these states represent distinct physical phenomena. In speech, for example, the human voice is characterized by distinct physical phenomena or modes, e.g., voiced speech, fricatives, stops, and nasal sounds. When applied to speech processing applications, the speech modes or components are first modeled by HMMs using an algorithm to estimate parameters for the HMMs (referred to as the training phase). The trained HMMs can then be used to determine which speech components are present in a speech signal (referred to as the recognition phase).

For the classical hidden Markov model (HMM), all observations are assumed to be realizations of a random statistical model that depends on the Markov state. Although the statistical models, i.e. the observation probability density functions (PDF's), are different for each state, they are defined on the same observation space. The dimension of this observation space needs to be high to adequately observe the information content of the data for all states. The high dimension requires a large number of observations (or training samples) and leads to poor performance with limited amounts of training data.

In speech, for example, a different set of parameters control the uttered sound during each of the speech modes. Furthermore, a distinct type of signal processing or feature extraction is best suited to estimate the corresponding parameters of each mode. But, since one cannot know a priori which mode is in effect at a given instant of time and cannot change the observation space accordingly, it is necessary to operate in a unified observation space.

This requires a feature set that carries enough information for the estimation of all modes. This in turn leads to dimensionality issues since there is only a finite amount of data with which to train the observation PDF estimates. In effect, the observation PDF's of each state are represented using a feature set with higher dimension than would be necessary if the other states did not exist. The amount of data required to estimate a PDF is exponentially dependent on feature dimension. Given limitations of computer storage and available data, feature dimensions above a certain point are virtually impossible to accurately characterize. As a result, one may be forced to use a subset of the intended feature set to reduce dimension or else suffer the effects of insufficient training data.

Consider a hidden Markov model (HMM) for a process with N states numbered $S_1$ through $S_N$. Let the raw data be denoted $X[t]$, for time steps $t=1,2,\ldots,T$. The parameters of the HMM, denoted $\lambda$, comprise the state transition matrix $A=\{a_{ij}\}$, the state prior probabilities $u_j$, and the state observation densities $b_j(X)$, where i and j range from 1 to N. These parameters can be estimated from training data using the Baum-Welch algorithm, as disclosed in the papers by Rabiner and Juang. But, because $X[t]$ is often of high dimension, it may be necessary to reduce the raw data to a set of features $z[t]=T(X[t])$. We then define a new HMM with the same A and $u_j$ but with observations $z[t]$, $t=1,2,\ldots T$ and the state densities $b_j(z)$ (we allow the argument of the density functions to imply the identity of the function, thus $b_j(X)$ and $b_j(z)$ are distinct).

This is the approach used in speech processing today where $z[t]$ are usually a set of cepstral coefficients. If $z[t]$ is of low dimension, it is practical to apply probability density function (PDF) estimation methods such as Gaussian Mixtures to estimate the state observation densities. Such PDF estimation methods tend to give poor results above dimensions of about 5 to 10 unless the features are exceptionally, i.e., "well-behaved" are close to independent or multivariate Gaussian. In human speech, it is doubtful that 5 to 10 features can capture all the relevant information in the data. Traditionally, the choices have been (1) use a smaller and insufficient features set, (2) use more features and suffer PDF estimation errors, or (3) apply methods of dimensionality reduction. Such methods include linear subspace analysis, projection pursuit, or simply assuming the features are independent (a factorable PDF). All these methods involve assumptions that do not hold in general.

The class-specific method was recently developed as a method of dimensionality reduction in classification, as disclosed in U.S. patent application Ser. No. 09/431,716 entitled "Class Specific Classifier." Unlike other methods of dimension reduction, it is based on sufficient statistics and results in no theoretical loss of performance due to approximation. Because of the exponential relationship between training data size and dimension, even a mere factor of 2 reduction in dimension can result in a significant difference.

SUMMARY OF THE INVENTION

Accordingly, one object of the present invention is to reduce the number of data samples needed for training HMMs.

Another object of the present invention is to extend the idea of dimensionality reduction in classification to the problem of HMM modeling when each state of the HMM may have its own minimal sufficient statistic.

A further object of the present invention is to modify the Baum-Welch algorithm used to estimate parameters of class-specific HMMs.

The foregoing objects are attained by the method and system of the present invention. The present invention features a method of training a class-specific hidden Markov model (HMM) used for modeling physical phenomena characterized by a finite number of states. The method comprises the steps of receiving training data forming an observation sequence; estimating parameters of the class-specific HMM from the training data using a modified Baum-Welch algorithm, wherein the modified Baum-Welch algorithm uses likelihood ratios with respect to a common state and based on the sufficient statistics for each state; and storing the parameters of the class-specific HMM for use in processing signals representing the physical phenomena.

The step of estimating parameters of the class-specific HMM preferably includes the step of conducting a plurality of iterations of the Baum-Welch algorithm, wherein each iteration of the Baum-Welch algorithm includes a class-specific forward procedure for calculating forward probabilities, a class-specific backward procedure for calculating backward probabilities, and HMM reestimation formulas for updating the parameters of the class-specific HMM based upon the forward probabilities and the backward probabilities.

The present invention also features a system for training a class-specific hidden Markov model (HMM) used for modeling physical phenomena characterized by a finite number of states. The system includes means for receiving training data represented as an observation sequence; means for estimating parameters of the class-specific HMM from the training data using a modified Baum-Welch algorithm, wherein the modified Baum-Welch algorithm uses likelihood ratios that compare each of the states to a common state; and means for storing the parameters of the class-specific HMM for use in processing signals representing the physical phenomena.

According to one example, the HMMs are used in speech processing and the physical phenomena includes modes of speech.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

The method and system, according to the present invention, is used to train class-specific hidden Markov models (HMM's) for use in modeling physical phenomena characterized by a finite number of states. In the exemplary embodiment, the system and method is used in a speech processing system to train class-specific HMMs modeling different modes or components of speech. The method of the present invention can also be applied to other types of systems for modeling other types of physical phenomena.

Figure 1:
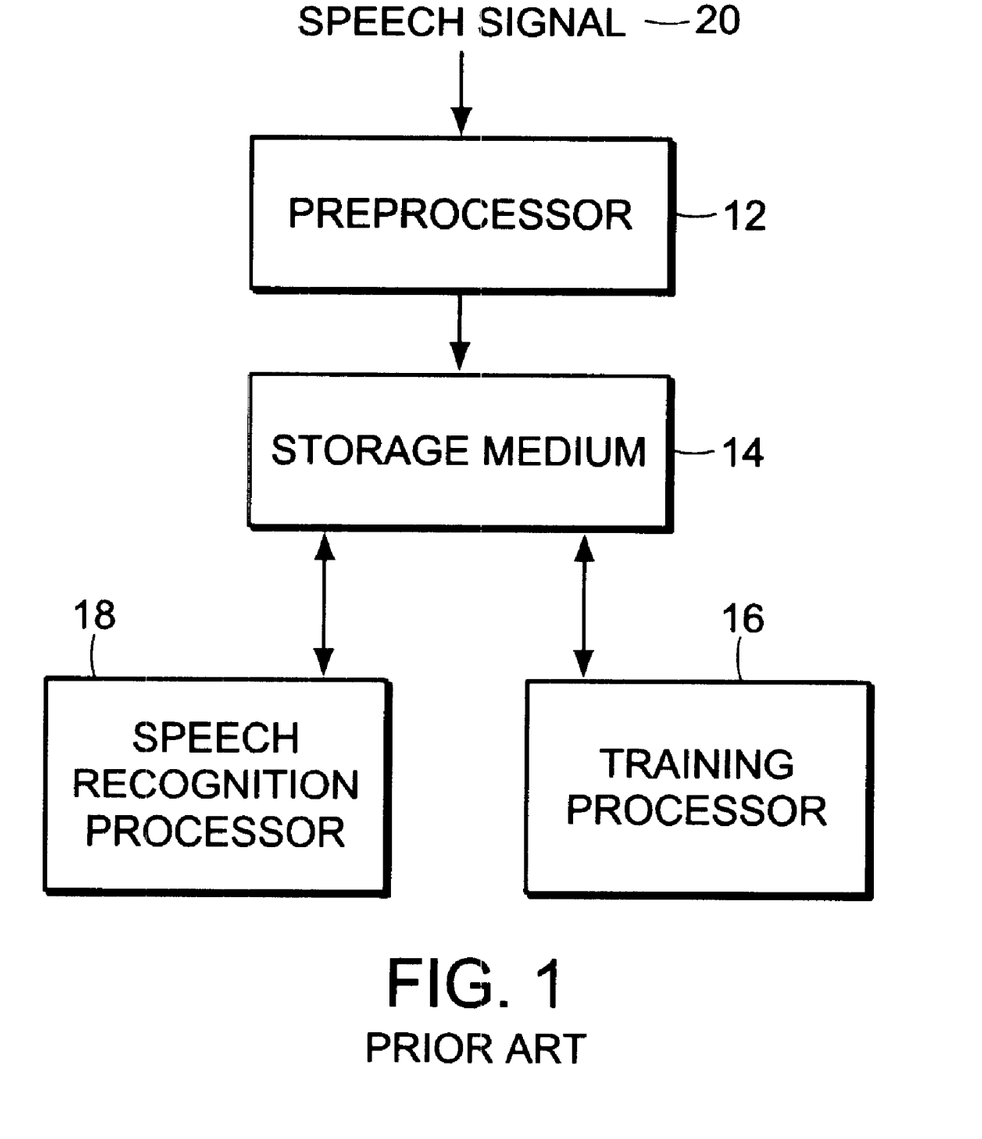
FIG. 1 is a schematic block diagram of a conventional system for training HMMs used in speech processing.

A conventional speech processing system 10, FIG. 1, generally includes a preprocessor 12, a storage medium 14, a training processor 16, and a recognition processor 18. The preprocessor 12 receives a "raw" input speech signal 20 and transforms the speech signal 20 into acoustic speech units, in the form of digital data, which are used to generate the HMMs. The preprocessor 12 samples the speech signal, extracts the features from the time series, and feeds them to a desired storage space (e.g., on the storage medium 14). The preprocessor can include any conventional preprocessing device known in the art since the method of the present invention is not dependent upon the structure of the preprocessor 12.

The training processor 16 is used to generate the estimated parameters of the HMMs and can include any suitable computer known in the art programmed to perform the training method of the present invention. The training processor 16 stores the HMMs and parameters for use by the speech recognition processor 18. The speech recognition processor 18 can also include any suitable computer known in the art programmed to perform speech recognition using the HMMs generated and stored by the training processor. The preprocessor 12,. a storage medium 14, a training processor 16, and a recognition processor 18 can be implemented as separate devices or as separate modules within a single computer.

Figure 2:
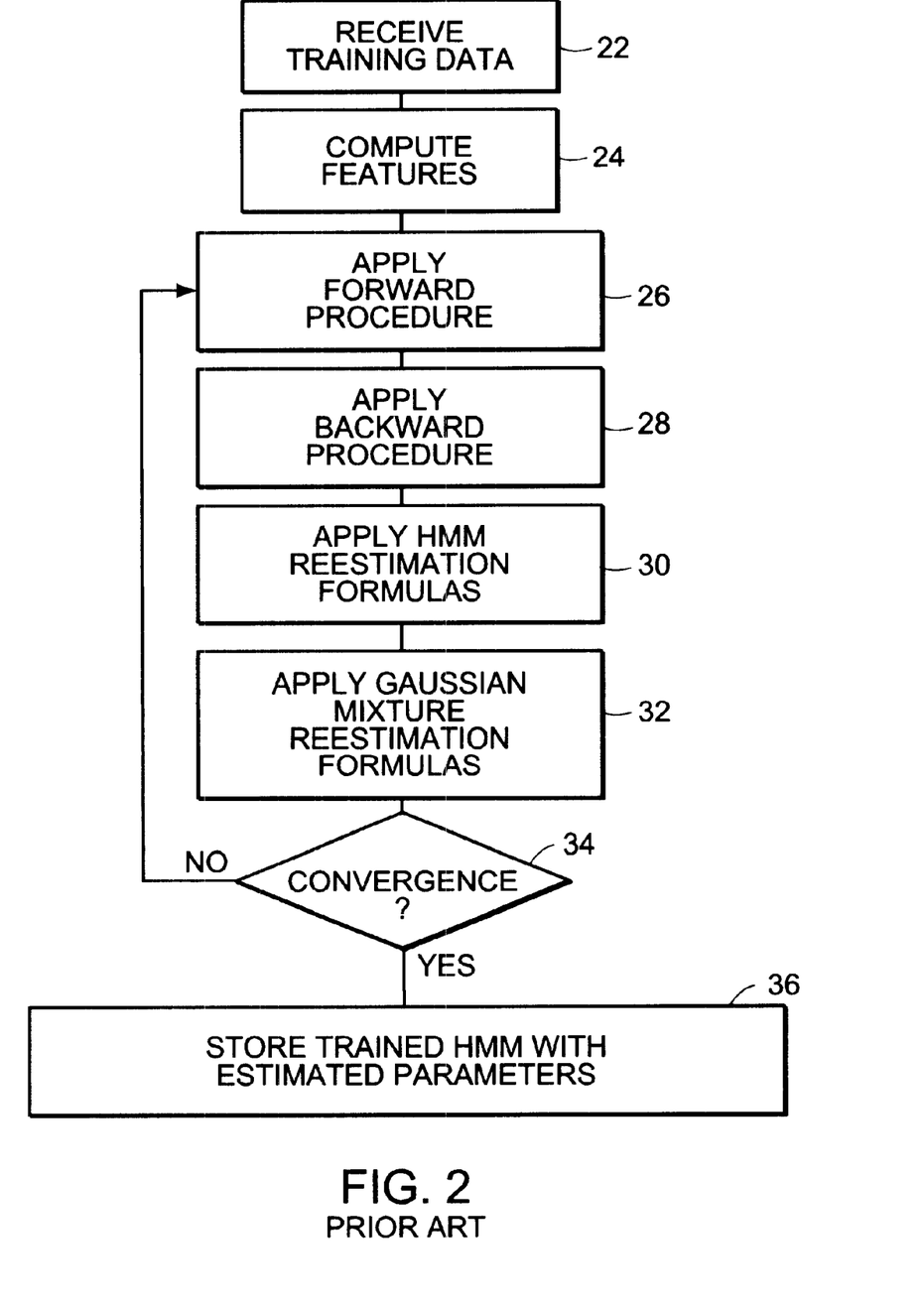
FIG. 2 is a flow chart illustrating the method of training HMMs in accordance with the prior art Baum-Welch algorithm.

FIG. 2 shows a method of training HMMs according to the prior art using the Baum-Welch algorithm. Training data is received in step 22. A feature set is computed in step 24. This computation extracts features which will allow one state of the HMM to be distinguished from another state. Step 26 calculates forward probabilities and step 28 calculates backward probabilities. HMM reestimation formulas are applied to the probability data function in step 30. Guassian mixture reestimation formulas are applied in step 32. In step 34, the algorithm determines if the probability data function has improved over the previous iteration. Steps 26–34 are performed again if the probability data function is still improving. Once the PDF has converged, the trained HMM with estimated parameters can be stored as in step 36.

Figure 3:
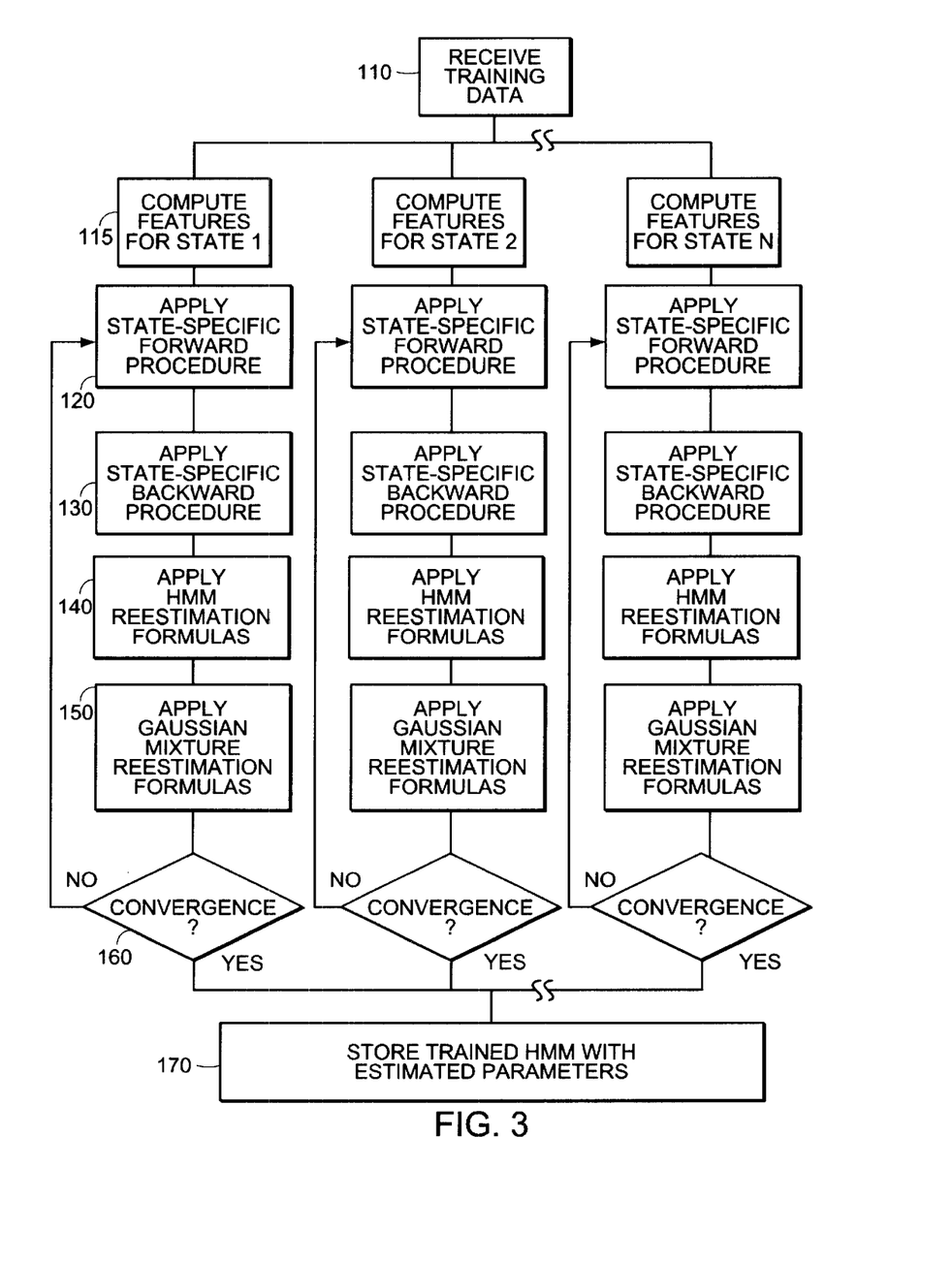
FIG. 3 is a flow chart illustrating a method of training HMMs for use in signal processing, according to the present invention.

The method of training the class-specific HMMs, according to the present invention, is illustrated in FIG. 3. First, the training data is received, step 110. In the exemplary embodiment, the training data is the digital data stored in the storage medium 14 by the preprocessor 12. Next, the parameters of the class-specific HMM are estimated from the training data using a modified Baum-Welch algorithm, steps

115–160, as will be described in greater detail below. In the exemplary embodiment, this algorithm is performed by the training processor 16. The trained class-specific HMM with the estimated parameters is then stored, step 170, for example, in the storage medium 14 to be used by the speech recognition processor 18.

The modified Baum-Welch algorithm is preferably an iterative algorithm that calculates new estimates of the HMM parameters given an observation sequence and a previous estimate of the HMM parameters. The Baum-Welch algorithm is generally composed of two parts: the forward/backward procedure and the reestimation of parameters. In step 115, the modified Baum-Welch algorithm of the present invention first extracts features which will allow distinction of one state or class from the common class. The current invention then applies a state-specific forward procedure to calculate forward probabilities, step 120, and a class-specific backward procedure to calculate backward probabilities, step 130. The modified Baum-Welch algorithm then applies HMM reestimation formulas based upon the forward and backward probabilities to update the parameters, step 140. The method can also apply Gaussian mixture reestimation formulas, step 150. The steps 120–150 of the Baum-Welch algorithm are repeated until convergence.

As can be seen in FIG. 3, features and PDFs are computed for each state. The number of states can be any number from 1 to N. After features are calculated for a particular state, the Baum-Welch algorithm is used to refine PDF for the state.

The modified Baum-Welch algorithm allows each state to be observed using a different set of features rather than relying on a common feature set. Each feature set (or observation space) is chosen to be a sufficient statistic for discrimination of the given state from a common "white-noise" state. Comparison of likelihood values is possible through the use of likelihood ratios with respect to the common statistical model. The new algorithm is the same in theory as the algorithm based on a common feature set, but without the necessity of estimating high-dimensional probability density functions (PDFs).

In speech, for example, the word "Act" has the voiced sound "A" and unvoiced sounds "c" and "t". The voiced and unvoiced sounds are produced by distinctly different mechanisms. The class-specific method considers each sound separately in a set of binary tests to a common (noise-only) condition. Let us ignore for the moment the relationship between these sounds in time and consider only the static classification problem. We consider the binary test of "A" vs. white noise, the test of "c" vs. white noise, and the test of "t" vs. white noise. Each of these simpler tests may have a distinct sufficient or approximately sufficient class-specific statistic. The sufficient statistic for these simpler tests are almost certainly lower in dimension than a sufficient statistic for the combined (3-way classification) problem. It can be shown that the union of the three class-specific statistics is a sufficient statistic for the combined problem based on a test that in theory has the same probability of error as the optimal test based on the raw data. This union of features is a sufficient statistic for the HMM as well. A class-specific HMM can be constructed in a manner that involves only PDF estimates involving the separate class-specific feature vectors, not the union.

To establish some notation, the classic HMM is reviewed using the notation from the Juang paper (with the exception that the PDF's are represented as $p(\cdot)$ and $b_j(\cdot)$ instead of $f(\cdot)$ and $f_j(\cdot)$). Consider a set of state occurrences $\theta \triangleq \{\theta_0, \theta_1, \ldots \theta_T\}$ which are the result of a Markov chain with state priors $u_j$, $j=1,2,\ldots,N$ and state transition matrix A. Rather than observing the states $\theta$ directly, we observe the stochastic outputs $\Delta\{s_0, s_1, \ldots, s_T\}$ which are realizations from a set of state PDF's $b_j(s)$, $j=1,2,\ldots,N$ such that:

$$p(S|\theta) = \prod_t b_{\theta_t}(s_t) \quad (1)$$

Note that s is used to denote an observation at an unspecified time, while the bold notation S denotes the collection of all observations from $t=1,\ldots,T$. The complete set of parameters $\lambda$ defining the HMM are $$\lambda \triangleq \begin{cases} \mathbf{u} \triangleq u_j, & j \in [1\ldots N], \\ A \triangleq a_{ij}, & j \in [1\ldots N] \quad j \in [1\ldots N], \\ b_j & j \in [1\ldots N], \end{cases} \quad (2)$$

The class-specific HMM is defined as follows. Let the observations $s_t$ be each passed into a bank of N feature transformations 115. For each observation $s_t$, we have features, $z_{j,t}=T(s_t)$, $j=1,\ldots,N$. These features are sufficient statistics, as described below, and are of lower dimension than $s_t$. The goal is to derive an estimation algorithm for the Markov model based on these lower-dimensional statistics. The parameter vector $\lambda$ for the class-specific HMM is denoted $$\lambda^z \triangleq \{u, A, \{b_j^z j \in [1\ldots N]\}\} \quad (3)$$

where $b_j^z(\cdot)$ is the PDF of $z_j=T_j(s)$ when state j is true. This does not require the distribution of $z_j$ when state k is true ($k \neq j$).

To apply the class-specific method, we need to define a condition that is common to all states. Let the PDF of s in each state j be dependent on an underlying unknown parameter set $\lambda_j$ with distribution $f_j(\lambda_j)$, thus $$b_j(s) = \int_{\lambda_j} b_j(s|\lambda_j) f_j(\lambda_j) d\lambda_j, j \in [1\ldots N]. \quad (4)$$

In most, if not all, signal processing applications, the observations s. are corrupted by noise. Let the parameter set for each state include an amplitude parameter $a_j$ $$\lambda_j = [a_j, \lambda'_j] \quad (5)$$

such that there is a common noise-only condition $H_0$ defined by $$H_0: a_1 = a_2 = \ldots a_N = 0. \quad (6)$$

Let the distribution of s under $H_0$ be denoted $b_0(s)$:

$$b_0(s) \triangleq \{b_1(s|[0\lambda'_1] = b_2(s|[0\lambda'_1] = \ldots = b_N(s|[0\lambda'_N]). \quad (7)$$

We assume $s_t$ are independent under $H_0$. Thus, $$p(S|H_0) = \prod_{t=1}^{T} b_0(s_t). \quad (8)$$

While this structure does not seem to fit many problems of interest, any problem can be modified to include an amplitude parameter even if the amplitude parameter is never zero. Furthermore, the noise-only condition $H_0$ can have an arbitrarily small assumed variance because $H_0$ is only a theoretical tool and does not need to approximate any realistic situation. The choice of $H_0$, however, affects the choice of sufficient statistics.

For each state j, let there exist a sufficient statistic for $z=T_j(s)$ such that the Neyman-Fisher factorization holds:

$$b_j(s|\lambda_j) =_{32} g_j(z_j;\lambda_j)h_j(s). \tag{9}$$

It is well known, and follows from the above factorization, that the likelihood ratio is invariant if written in terms of a sufficient statistic:

$$\frac{b_j(s\mid \lambda_j)}{b_0(s)} = \frac{b_j^z(z_j;\lambda_j)}{b_{0,j}^z(z_j)} \tag{10}$$

where $b_j^z(z_j;\lambda_j)$ and $b_{0,j}^z(z_j)$ are the PDFs of $z_j$ under state j and $H_0$. Marginalizing both sides over $\lambda_j$, $$\frac{\int_{\lambda_j} b_j(s\mid \lambda_j)f_j(\lambda_j)d\lambda_j}{b_0(s)} = \frac{\int_{\lambda_j} b_j^z(z_j;\lambda_j)f_j(\lambda_j)d\lambda_j}{b_{0,j}^z(z_j)} \tag{11}$$

we obtain the relationship $$\frac{b_j(s)}{b_0(s)} = \frac{b_j^z(z_j)}{b_{0,j}^z(z_j)} \tag{12}$$

Thus, we say that $z_j$ is a sufficient statistic for the binary hypothesis test for state j vs. $H_0$. The distributions of the statistics under $H_0$:$b_0(s)$ and $b_{0,j}^z(z_j)$ are assumed to be known. Often we let $H_0$ be white Gaussian noise for which it may be possible to derive the densities analytically.

We assume the following Gaussian mixture representation for each $b_j^z(z_j)$:

$$b_j^z(z_j) = \sum_{k=1}^{M} c_{jk} N(z_j, \mu_{jk}^z, U_{jk}^z), \quad 1 \leq j \leq N. \tag{13}$$

where K is the mode number $$N(z_j,\mu, U) \triangleq \{(2\pi)^{-P_j/2}|U|^{-1/2} \exp\{-\tfrac{1}{2}(s-\mu)'U^{-1}(s-\mu)\}, \tag{14}$$

and $P_j$ is the dimension of $z_j$. Note that there is no problem assuming that M is independent of j as long as M is sufficiently large for the worst case.

Central to the Baum-Welch algorithm is the ability to calculate the probability that a state is true at a particular time given an observation sequence. These probabilities depend on the forward and backward probabilities, which in turn depend on the state likelihood functions. It is possible to re-formulate the problem to compute these probabilities using low-dimensional PDF's obtained by replacing likelihood functions with likelihood ratios based on the sufficient statistics for each state. When compared to the standard feature-based HMM using a common feature set, the parameters may be estimated using fewer training samples or for a fixed number of training samples, more accuracy and robustness can be obtained.

The class-specific Baum-Welch algorithm is now described in detail. The HMM can be used as a classifier by calculating $p(S|\lambda)$. This is accomplished efficiently by the forward procedure. A far more difficult problem is the estimation of $\lambda$ from training data:

$$\max_{\lambda \in \Lambda} p(S \mid \lambda). \tag{15}$$

A well-behaved iterative algorithm based on the Expectation Maximization (EM) method is available as defined by Juang. Formulas for updating the parameters $\lambda$ at each iteration are called the reestimation formulas. The derivation by Juang is well known for the case when $b_j(s)$ are Gaussian mixtures. The derivation of Juang is modified to estimate the parameters of Gaussian mixture representations for $b_j^z(z_j)$.

We begin with the global density for the HMM (Juang eq. 3)

$$p(S \mid \lambda) = \sum_{\theta \in \Theta} u_{\theta_0} \prod_{t=1}^{T} a_{\theta_{t-1}\theta_t} b_{\theta_t}(s_t). \tag{16}$$

We may re-write the above as $$p(S \mid \lambda) = \frac{p(S\mid \lambda)}{p(S\mid H_0)} p(S H_0) = \left[\sum_{\theta \in \Theta} u_{\theta_0} \prod_{t=1}^{T} a_{\theta_{t-1}\theta_t} \frac{b_{\theta_t}(s_t)}{b_0(s_t)}\right] p(S \mid H_0) \tag{17}$$

using equation (8). By the sufficiency relationship of equation (12), we have $$p(S\mid \lambda) = \left[\sum_{\theta \in \Theta} u_{\theta_0} \prod_{t=1}^{T} a_{\theta_{t-1}\theta_t} \frac{b_j^z(T_j(s_t))}{b_{j,0}^z(T_j(s_t))}\right] p(S\mid H_0). \tag{18}$$

Thus, $$p(S\mid \lambda) = \left[\sum_{\theta \in \Theta} u_{\theta_0} \prod_{t=1}^{T} a_{\theta_{t-1}\theta_t} \frac{\sum_{k=1}^{M} c_{jk} N(T_j(s_t), \mu_{jk}^z, U_{jk}^z)}{b_{j,0}^z(T_j(s_t))}\right] p(S\mid H_0). \tag{19}$$

We define $$b_{jk}^z(s, \lambda^z) \triangleq \frac{N(T_j(s), \mu_{jk}^z, U_{jk}^z)}{b_{j,0}^z(T_j(s_t))} p(S\mid H_0) \tag{20}$$

(note that $b_{jk}^z(\cdot)$ and $b_{0,j}^z(\cdot)$ where $j=1,2,\ldots,N$ and $k=1,2,\ldots,M$ are unrelated). We then have $$p(S\mid \lambda^z) = \sum_{\theta \in \Theta} u_{\theta_0} \prod_{t=1}^{T} \left[a_{\theta_{t-1}\theta_t} \sum_{k=1}^{M} c_{\theta_t k} b_{\theta_t k}^z(s_t, \lambda^z)\right] \tag{21}$$

which is the same as (Juang eq. 8). We then may follow the proof of Juang, provided the necessary requirements of $b_{jk}^z(s\lambda^z)$ are met.

Notice that $b_{jk}^z(s,\lambda^z)$ depends on $\lambda^z$ only through the multivariate Gaussian density. Thus, $b_{jk}^z(s,\lambda^z)$ meets the necessary log-concavity and elliptical symmetry requirements necessary for the reestimation formulas that follow. We can proceed in the proof of Juang, until it is necessary to differentiate $b_{jk}^z(s_t,\lambda^z)$ with respect to $\lambda^z$. At that point, the additional terms in equation (20), not dependent on $\lambda^z$, do not affect the solution of the maximization; we only need to let $z_{j,t}$ take the place of $s_t$. For recursive computation of the forward and backward probabilities, we could use $$b_j(s_t) = b_0(s_t) \frac{b_j^z(T_j(s_t))}{b_{j,0}^z(T_j(s_t))}, \tag{22}$$

which follows directly from equation (12). However, this requires knowledge of $s_t$. If we adopt the class-specific approach, we would like to forget $s_t$ altogether. If we use instead $$b_j^c(s_t) = \frac{b_j^z(T_j(s_t))}{b_{0,j}^z(T_j(s_t))}, \tag{23}$$

the resulting forward and backward probabilities, which we rename $\alpha_t^c(i)$ and $\beta_t^c(j)$ are related to $\alpha_t(i)$ and $\beta_t(j)$ through:

$$\alpha_t^c(j) = \frac{\alpha_t(j)}{\prod_{u=1}^{t} b_0(s_u)} \tag{24}$$

and $$\beta_t^c(j) = \frac{\beta_t(j)}{\prod_{u=t+1}^{t} b_0(s_u)}, \tag{25}$$

which yields at termination $$\sum_{j=1}^{N} \alpha_T^c(j) = \frac{p(\mathbf{S} \mid \lambda^z)}{p(\mathbf{S} \mid H_0)}. \tag{26}$$

Since these quantities are used with normalization, it may be verified that the added factors have no affect on the reestimation formulas.

Accordingly, the modified Baum-Welch algorithm is as follows:

The class-specific forward procedure
1. Initialization:

$$\alpha_1^c(i) = u_i \frac{b_i^z(z_{i,1})}{b_{0,i}^z(z_{i,1})}, \quad 1 \le i \le N \tag{27}$$

2. Induction:

$$\alpha_{t+1}^c(j) = \left[\sum_{i=1}^{N} \alpha_t^c(i) a_{ij}\right] \frac{b_j^z(z_{j,t+1})}{b_{0,j}^z(z_{j,t+1})}, \quad 1 \le t \le T-1, \ 1 \le j \le N \tag{28}$$

3. Termination:

$$\frac{p(\mathbf{S} \mid \lambda^z)}{p(\mathbf{S} \mid H_0)} = \sum_{i=1}^{N} \alpha_T^c(i) \tag{29}$$

The class-specific backward procedure
1. Initialization:

$$\beta_T^c(i) = 1 \tag{30}$$

2. Induction:

$$\beta_t^c(i) = \sum_{j=1}^{N} a_{ij} \frac{b_j^z(z_{j,t+1})}{b_{0,j}^z(z_{j,t+1})} \beta_{t+1}^c(j), \quad t = T-1, T-2, \ldots 1 \tag{31}$$

$$1 \le i \le N$$

HMM Reestimation formulas Define $\gamma_t(j)$ as $p(\theta_t = j \mid S)$. We have $$\gamma_t(j) = \frac{\alpha_t^c(j) \beta_t^c(j)}{\sum_{i=1}^{N} \alpha_t^c(i) \beta_t^c(i)} \tag{32}$$

Let $$\xi_t(i, j) = \frac{\alpha_t^c(i) a_{ij} \frac{b_j^z(z_{j,t+1})}{b_{0,j}^z(z_{j,t+1})} \beta_{t+1}^c(j)}{\sum_{i=1}^{N} \sum_{m=1}^{N} \alpha_t^c(i) a_{im} \frac{b_m^z(z_{m,t+1})}{b_{0,m}^z(z_{m,t+1})} \beta_{t+1}^c(m)} \tag{33}$$

The updated state priors are $$\hat{u}_i = \gamma_1(i). \tag{34}$$

The updated state transition matrix is $$\hat{a}_{ij} = \frac{\sum_{t=1}^{T-1} \xi_t(i, j)}{\sum_{t=1}^{T-1} \gamma_t(i)}. \tag{35}$$

Keep in mind that $\gamma_t(j)$, $\xi_t(i,j)$, $\hat{u}_i$, and $\hat{u}_{ij}$ will be identical to those estimated by the conventional approach if equation (12) is true. There is no correspondence, however, between the Gaussian mixture parameters of the two methods except that the densities they approximate obey equation (12).

Gaussian mixture reestimation formulas
Let $$\gamma_t^c(j, m) = \gamma_t(j) \left[\frac{c_{jm} N(z_{j,t}, \mu_{jm}^z, U_{jm}^z)}{b_j^z(z_{j,t})}\right] \tag{36}$$

$$\hat{c}_{jm}^z = \frac{\sum_{t=1}^{T} \gamma_t^c(j, m)}{\sum_{t=1}^{T} \sum_{l=1}^{M} \gamma_t^c(j, l)}, \tag{37}$$

$$\hat{\mu}_{jm}^z = \frac{\sum_{t=1}^{T} \gamma_t^c(j, m) z_{j,t}}{\sum_{t=1}^{T} \gamma_t^c(j, m)} \tag{38}$$

and $$\hat{U}_{jm}^z = \frac{\sum_{t=1}^{T} \gamma_t^c(j, m) (z_{j,t} - \mu_{jm}^z)(z_{j,t} - \mu_{jm}^z)'}{\sum_{t=1}^{T} \gamma_t^c(j, m)} \tag{39}$$

Since the class-specific approach is based on sufficient statistics, one must find the sufficient statistics. In real-world problems, the sufficient statistics are not well defined because no mathematical formulas are known for the densities. If we look at conventional classifiers and HMM's, we often make the "leap" from raw data to a feature set without being overly concerned if the feature set is sufficient or not. The same is true for the class-specific method. We should be no more concerned about exact sufficiency than we are for conventional feature-based approaches. Sufficiency is used for the theoretical development only—the theory then serves as a guide to the practice.

One way to arrive at approximate sufficiency is to develop features from which the original time-series (from a given state) can be reconstructed to a suitable fidelity. If we were to build a classifier to distinguish human speech from other natural sounds, we could say that linear prediction coefficients are approximately sufficient for human speech because the speech could be intelligibly reconstructed from the features. The degree of sufficiency needed in any given problem depends on the application. The LPC coefficients would not be sufficient for a lie detector which needs more subtle information.

The relationship of the class-specific Baum-Welch algorithm to the conventional algorithm is described below. The conventional Baum-Welch algorithm computes $$\max_\lambda p(S \mid \lambda), \tag{40}$$

while the class-specific counterpart (see eq. 16) computes $$\max_{\lambda^z} g(Z \mid \lambda^z) \, p(S \mid H_0) \tag{41}$$

where $$Z \triangleq \{z_1, z_1 \ldots, z_N\} \tag{42}$$

and $$z_{j \triangleq \{T_j(s_1), T_j(s_2), \ldots, T_j(s_T)\}}. \tag{43}$$

In addition to the relationship between the parameter estimates of the two algorithms, the methods are also related as classifiers. If we had the true parameter values of $\lambda$, $\lambda^z$, so that equation (12) held, it is clear from equation (16) that $$p(S \mid \lambda) = g(Z \mid \lambda^z) p(S \mid H_0). \tag{44}$$

Thus, given M classes and M sets of parameters $\lambda_m$, $\lambda_m^z$, m=1, . . . , M, the classifiers $$\arg\max_{m=1}^{M} p(S \mid \lambda_m) \tag{45}$$

and $$\arg\max_{m=1}^{M} g(Z \mid \lambda_m^z) p(S \mid H_0) \tag{46}$$

give the same answer. Thus, S and Z are equivalent statistics for classification purposes or Z is sufficient for the problem. If we combine the class-specific features into a common feature vector Z by forming the union of the class-specific features, $$Z = U\{z_1, \ldots, z_n\}, \tag{47}$$

then we could use Z in place of s in a conventional HMM. Any common feature vector from which we can derive the class-specific features is sufficient because the class-specific features are sufficient. Thus, a side benefit of the class-specific method is the identification of a sufficient common feature set Z. If we consider the static M-ary classification problem, it is a well known result that the ratios $$\frac{p(X \mid H_1)}{p(X \mid H_0)}, \frac{p(X \mid H_2)}{p(X \mid H_0)}, \ldots, \frac{p(X \mid H_M)}{p(X \mid H_0)} \tag{48}$$

are sufficient for the M-ary classification problem. The sufficiency property is used to reduce each of these ratios separately by an appropriate choice of sufficient statistics:

$$\frac{p(z_1 \mid H_1)}{p(z_1 \mid H_0)}, \frac{p(z_2 \mid H_2)}{p(z_2 \mid H_0)}, \ldots, \frac{p(z_M \mid H_M)}{p(z_M \mid H_0)} \tag{49}$$

Thus, clearly $z_1, z_2, \ldots, z_m$ together are sufficient for the M-ary problem.

Test Results

To test the concept of the modified Baum-Welch algorithm (or Specific HMM), a Markov model was created. The following transition matrix and state priors were used:

$$A = \begin{bmatrix} 0.7 & 0.3 & 0 & 0 & 0 & 0 \\ 0 & 0.7 & 0.3 & 0 & 0 & 0 \\ 0 & 0 & 0.7 & 0.3 & 0 & 0 \\ 0 & 0 & 0 & 0.7 & 0.3 & 0 \\ 0 & 0 & 0 & 0 & 0.7 & 0.3 \\ 0.1 & 0 & 0 & 0 & 0 & 0.9 \end{bmatrix} \quad u = \begin{bmatrix} 0.167 \\ 0.167 \\ 0.167 \\ 0.167 \\ 0.167 \\ 0.167 \end{bmatrix} \tag{50}$$

For each state, there is a corresponding signal model. For each time step, a state is chosen randomly according to the Markov model. Then, a 256-sample segment of a time series is created from the statistical model corresponding to the chosen state. Features are then computed from each segment and used as an observation vector of an HMM. The following signal models were used:

An impulse of duration 2 samples occurring on samples 1 and 2 of the time-series with additive Gaussian noise of variance 1.

An impulse of duration 2 samples occurring on samples 2 and 3 of the time-series with additive Gaussian noise of variance 1.

Gaussian noise of variance greater than 1.

Sinewave of frequency 0.100 radians/sec in additive Gaussian noise of variance 1.

Sinewave of frequency 0.101 radians/sec in additive Gaussian noise of variance 1.

Second-order autoregressive noise of variance 1.

The criteria for selecting these synthetic signals were (a) the signals are easy to describe and produce, (b) a sufficient or approximately sufficient statistic was known for distinguishing each signal from $H_0$, (c) these statistics had a known density under $H_0$, (d) the signals and statistics were diverse and statistically dependent (otherwise a factorization of the PDF is possible). The common signal class, $H_0$, is iid Gaussian noise of zero mean and unit variance, denoted N (0,1). For each model, a sufficient statistic is chosen for distinguishing the signal from $H_0$. These are denoted $z_1$ through $z_6$.

Each signal is described in detail below including the sufficient statistic for distinguishing the signal from $H_0$, and formulas for the PDF of each sufficient statistic under $H_0$.
Signal classes 1 and 2: impulses in additive noise.
Signal class 1 follows the model $$x_t = 2(\delta[t] + \delta[t-1]) + n_t, \quad (51)$$

where $\delta[t]=1$ if $t=0$ and equals zero otherwise. The independent additive noise $n_t$ is distributed $N(0,1)$. A sufficient statistic for distinguishing this signal from $H_0$ is $$z_1 = x_0 + x_1. \quad (52)$$

The distribution of $z_1$ under $H_0$ is clearly normal with mean zero and variance 2:

$$\log p(z_1|H_0) = -0.5 \log (4\pi) - 0.25 z_1^2. \quad (53)$$

Signal class 2 follows the model $$x_t = 2(\delta[t-1] + \delta[t-2]) + n_t. \quad (54)$$

A sufficient statistic for distinguishing this signal from $H_0$ is $$z_2 = x_1 + x_2. \quad (55)$$

The distribution of $z_2$ under $H_0$ is identical to the distribution of $z_1$ under $H_0$.

Signal class 3: random noise with variance greater than 1.

Signal type 3 is iid Gaussian noise of zero mean and variance 1.7. A sufficient statistic for distinguishing this signal from $H_0$ is $$z_3 = \log\left\{\sum_{t=1}^{N} x_t^2\right\}. \quad (56)$$

The distribution of $z_3$ under $H_0$ is Chi-squared with N degrees of freedom:

$$\log p(z_3|H_0) = -\log \Lambda(N/2) - (N/2) \log (2) + (N/2) z_3 - \exp(z_3)/2. \quad (57)$$

Signal classes 4 and 5: Sinewaves in additive noise.
Signal class 4 and 5 follow the model $$x_t = n_t + a \sin(\omega_k t + \phi), \quad (58)$$

where $\phi$ is a uniformly distributed random phase and $a=0.4$ and $\omega_k$ depends on the signal class k: $\omega_4 = 0.1$, $\omega_5 = 0.101$ radians per sample. The additive noise $n_t$ is distributed $N(0,1)$. A sufficient statistic for distinguishing these signals from $H_0$ is $$z_k = \log\left\{\left|\sum_{t=1}^{N} x_t e^{-j\omega_k t}\right|^2\right\} \quad k = 4, 5 \quad (59)$$

The distribution of $z_4$ and $z_5$ under $H_0$ is the distribution of the log of a scaled $\chi^2(2)$ random variable. More precisely, $$\log p(z_k | H_0) = -\log N - \frac{\exp\{z_k\}}{N} + z_k \quad k = 4, 5. \quad (60)$$

Signal class 6: Second-order autoregressive noise of variance 1.

Signal type 6 is autoregressive noise of variance 1. We have $$x_t = [-a_1 x_{t-1} - a_2 x_{t-2} + n_t] a \quad (61)$$

where $n_t$ is distributed $N(0,1)$. The autoregressive coefficients are fixed at values of $a_1 = -0.75$, $a_2 = 0.78$. The theoretical output autocorrelation may be solved for analytically, and gives $r_0 = 3.1048 \, \alpha^2$. Thus, to create a first-order AR process of variance 1, we require $\alpha = 0.5675$. Because the variance of the resulting process is 1, it is distinguished from $H_0$ primarily by its first 2 autocorrelation lags. Thus, an approximate sufficient statistics to distinguish this signal type from $H_0$ are the first 2 autocorrelation function estimates. The theoretical distribution of the normalized circular autocorrelation estimates $\{\tilde{r}_1, \tilde{r}_2, \ldots, \tilde{r}_P\}$, where P is the model order, $$\tilde{r}_k = \hat{r}_k / \hat{r}_0, \quad k=1,2,\ldots,P, \quad (62)$$

and $$\hat{r}_k = \frac{1}{N}\sum_{i=1}^{N} x_i x_{(i-k) \bmod N}, \quad (63)$$

are known. There is a 1:1 transformation that can be used to transform $\{\tilde{r}_k\}$ into statistics that are better-behaved statistically (the distribution appears to closer to Gaussian and may be approximated with a Gaussian Mixture of low model order). Such a transformation consists of first converting $\{\tilde{r}_k\}, k=1,\ldots,P$ into reflection coefficients $\{\hat{K}_1, \hat{K}_2, \ldots, \hat{K}_P\}$, then applying the transformation $$K'_k = \log\left(\frac{1-K_k}{1+K_k}\right). \quad (64)$$

In summary, statistic $z_6$ is produced as follows (with P=2):
1. Compute $\{\hat{r}_0, \hat{r}_1, \hat{r}_2, \ldots \hat{r}_P\}$.
2. Normalize. Let $\tilde{r}_k = \hat{r}_k/\hat{r}_0$, k=1,2, ..., P.
3. Convert $\{\tilde{r}_k\}$ to reflection coefficients $\{K_k\}$. For P=1 this is trivial: $K_1 = -\tilde{r}_1$.
4. Let $z_6 = \{K'_1, K'_2, \ldots, K'_P\}$ where $$K'_k = \log\left(\frac{1-K_k}{1+K_k}\right).$$

Under $H_0$, we may find the exact distribution of $\{\tilde{r}_k, k=1,2,\ldots,P\}$, however this becomes numerically unstable for large N. A simpler asymptotic form is available. The general form for the asymptotic (large N) distribution of $\{K'_1, \ldots, K'_P\}$ is the following. Let $$K_k = \left(\frac{1-\exp K'_k}{1+\exp K'_k}\right). \quad (65)$$

The log of the Jacobian of this transformation is $$\log J = -\sum_{k=1}^{P} \log\left(\frac{2}{|K_k^2 - 1|}\right), \quad (66)$$

and the distribution of $\{K_1, K_2, \ldots, K_P\}$ under $H_0$ is approximated for large N by the formula as follows:

Let $$c_0 = \log\Gamma\left(\frac{N}{2}\right) - \frac{\log\pi}{2} - \log\Gamma\left(\frac{N-1}{2}\right) \quad (67)$$

$$c_0 = \log\Gamma(N+1) - N\log 2 - \log\Gamma\left(\frac{N-1}{2}\right) - \log\Gamma\left(\frac{N+3}{2}\right) \quad (68)$$

Let $n_e$ be the largest integer less than or equal to P/2, and $n_O$ be the smallest integer greater than or equal to P/2. Then $$\log p(K_1, \ldots, K_P) = \sum_{i=1}^{n_e}\left\{c_e + 2\log(1+K_{2i}) + \frac{N-3}{2}\log(1-K_{2i}^2)\right\} += \quad (69)$$

$$\sum_{i=1}^{n_O}\left\{c_o + \log(1+K_{2i-1}) + \frac{N-3}{2}\log(1-K_{2i-1}^2)\right\}.$$

Then, $$\log p(z_6|H_0) = \log J + \log p(K_1, \ldots, K_P). \quad (70)$$

To illustrate the strength of the Class-Specific algorithm, it was compared with two classical implementations. The classical implementations used a 7-dimensional feature vector consisting of all features used by the Class-Specific (CS) approach. Two variations of the classical approach were created by assuming the Gaussian Mixtures had (1) a general covariance matrix ("classical") or CL approach) or (2) a diagonal structure which assumes all the features are statistically independent ("independence assumption" or IA approach). We will refer to these three methods by the abbreviations CS, CL, and IA.

The multiple record implementation of the HMM described in Section V.(B.) of the Rabiner paper (page 273) was used. All training and testing data was organized into records with a constant length of 99 data segments per record ($T_r=99$). Each segment consisted of 256 time samples. Features were computed on each segment (a segment is associated with a time-step or observation of the HMM).

In the experiment, algorithm performance was determined as a function of R. In the experiments, we used R=1,2,5,10, 20,40,80, 160, and 320 records. To measure algorithm performance of all implementations, the appropriate version of the Baum-Welch algorithm was first run to convergence on the available training data. Next, the Viterbi algorithm was used to determine the most likely state sequence on a separate pool of 640 records of testing data. The Viterbi algorithm (described in the Rabiner paper on pp. 263–264) was appropriately modified for the CS method by substituting likelihood ratios in place of likelihoods, as described above. The number of state errors divided by the number of opportunities (640 times 99) was used as a performance metric. For more accurate determination of algorithm performance, sixteen independent trials were made at each value of R.

The details of the algorithm as applied in the tests are now discussed in greater detail. Algorithm scaling as detailed in the Rabiner paper (pp. 272–273), is needed in any practical HMM implementation, especially in the class-specific HMM. To prevent singular covariance matrices, a small value, $\rho_{ji}^2$, i=1,2, ..., $P_j$ should be added to the diagonal elements of the matrix $U_{jm}^z$. In practice, it prevents collapsing covariance estimates due to insufficient data. Values of $\rho_{ji}^2$ are as follows: $z_1, z_2$: $1\times10^{-4}$, $z_2$ through $z_6$: $1\times10^{-6}$.

One difficulty arises in trying to determine the number of state errors. If the algorithm is initialized randomly, there is no predefined mapping between the states and the models. The CS approach was always observed to converge in such a way that the state and model indexes coincide. This is because the states are treated specially with respect to the sufficient statistic used. But for the CL and IA implementations of the HMM, there would be no way to predict the mapping if the initialization was random. Therefore, it would be necessary to search for the best mapping on each trial by minimizing the error count over all mappings. This approach was adopted initially, but because of "catastrophic" errors, as discussed below, an "assisted" initialization method was used instead. This solved the unknown mapping problem.

Two initialization methods are used, "unassisted" for the CS approach and "assisted" for the CL and IS approaches. The "unassisted" method was to initialize with many mixture components with means located at randomly selected data points, and covariances equal to the measured sample covariance of the ensemble of training data. The HMM probabilities u and $a_{ij}$ are initialized to uniform values of $1/N$. The "assisted" method and the reasons for it are discussed below.

During training, components are removed (pruned) if the corresponding $c_{jm}^z$ is "small", indicating an insufficient number of samples "used" by the component. The number of mixture components remaining after convergence thus increased with the amount of training. However, components were also merged together if it was determined that they were too "close". The measure of closeness was based on percentage of mutual overlap. As a result of "merging", the number of components reached a certain limit and stopped increasing. A full discussion of the pruning and merging rules is not in the scope of this paper and is of little academic interest; however, it may be of interest to state the average numbers of mixing components remaining after convergence. This is provided in Table 1 as follows.

TABLE 1

|  | State (CS) | | | | | | State (CL) | | | | | |
| --- | --- | --- | --- | --- | --- | --- | --- | --- | --- | --- | --- | --- |
| R | 1 | 2 | 3 | 4 | 5 | 6 | 1 | 2 | 3 | 4 | 5 | 6 |
| 5 | 1.5 | 1.3 | 1.6 | 2.1 | 1.8 | 2.7 | 1.0 | 1.0 | 1.0 | 1.0 | 1.2 | 2.9 |
| 10 | 1.4 | 1.4 | 1.3 | 2.5 | 2.0 | 2.6 | 2.1 | 2.1 | 1.7 | 2.0 | 2.0 | 6.1 |
| 20 | 1.1 | 1.1 | 1.2 | 2.5 | 2.2 | 2.6 | 4.0 | 4.1 | 3.4 | 4.1 | 3.7 | 7.6 |
| 40 | 1.1 | 1.0 | 1.3 | 2.7 | 2.4 | 2.9 | 6.2 | 7.9 | 7.2 | 6.0 | 6.3 | 8.3 |
| 80 | 1.0 | 1.0 | 1.0 | 2.5 | 2.3 | 2.6 | 8.0 | 9.0 | 9.7 | 8.5 | 7.8 | 8.9 |
| 160 | 1.0 | 1.0 | 1.0 | 2.6 | 2.4 | 2.4 | 8.7 | 9.0 | 10 | 9.8 | 8.0 | 9.0 |
| 320 | 1.0 | 1.0 | 1.0 | 2.8 | 2.5 | 2.3 | 8.8 | 9.0 | 10 | 10 | 8.0 | 9.0 |

The CL and IA approaches encountered severe problems with initialization. More often than not, a poor initialization resulted in the Baum-Welch algorithm finding the incorrect stationary point. This resulted in catastrophic errors. This appeared to be caused by an inability to distinguish two or more states. The number of catastrophic errors decreased as the number of training records increased.

The CS method did not encounter any catastrophic errors like this. To study only the PDF estimation issue apart from any initialization issues, it was decided to "assist" the CL and IA approaches by providing a good initialization point. This initialization point was found by training separately on separate labeled data from each of the states, then using these PDF's as the state PDF's with the known u and A. In short, the algorithm was initialized with the true parameter values. This "good" parameter set was used as the starting point for all trials of the CL and IA approaches. Doing this provides somewhat of a "lower bound" on error performance. The CS results were unassisted.

Figure 4:
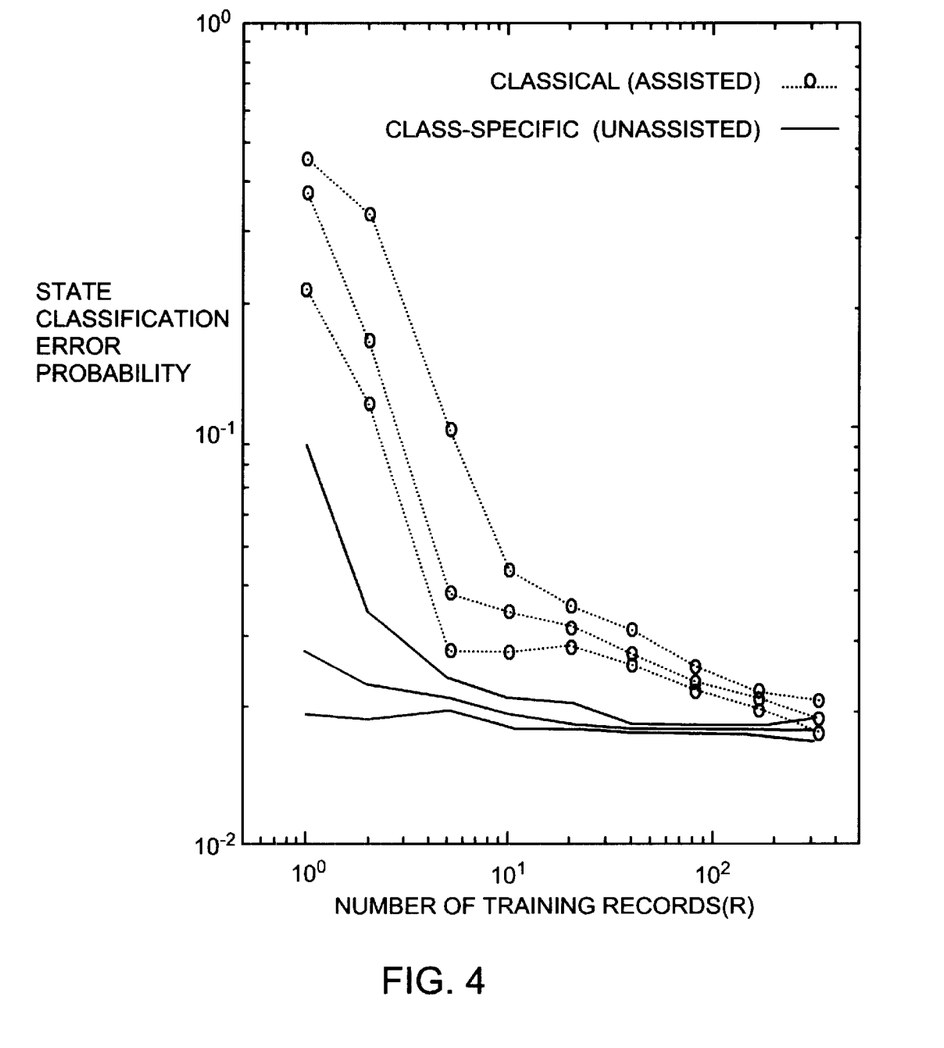
FIGS. 4 and 5 are diagrams illustrating state classification error probabilities as a function of number of training records for the method of the present invention compared to conventional methods.
Figure 5:
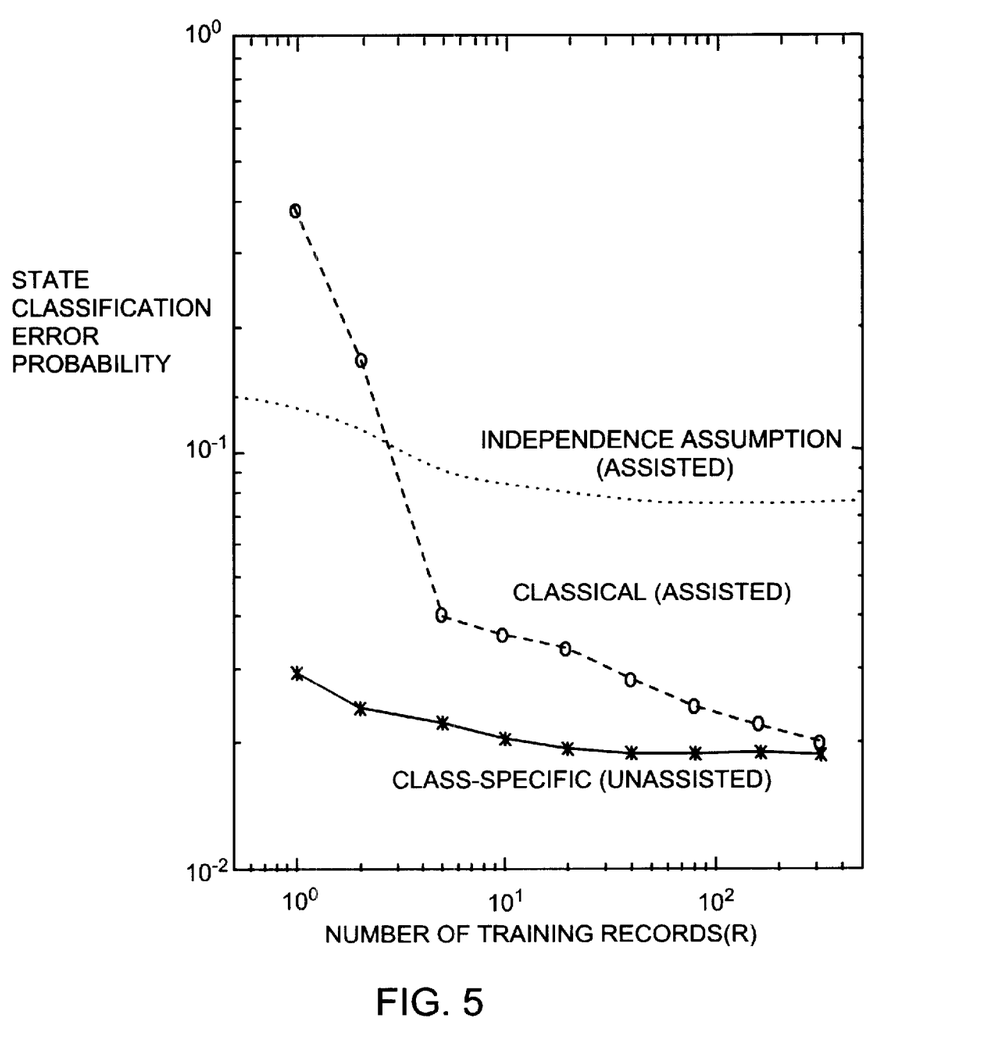

A plot of the average error probability for the CL and CS methods as a function of R is shown in FIG. 4. The three lines represent maximum, minimum, and median $P_e$ out of 16 trials at each R. From this graph, it is clear that the CL can achieve the same $P_e$, however requires far more data. Now consider FIG. 5 in which we add results of the IA method and show only the median error curves. The IA approach has a higher limiting error rate, due to the built-in assumption of independence, which is not valid. It has, however, nearly identical convergence behavior as the CS method. This is expected since the dimension of the PDF estimates is similar for the two approaches.

Accordingly, the present invention provides a method and system for training class-specific HMMs using a modified Baum-Welch algorithm. The class-specific implementation of the Baum-Welch algorithm has been developed and verified to work in principle. A computer simulation used a 6-state HMM with six synthetic signal models. The class-specific feature dimensions were either 1 or 2. When the performance was measured in terms of state errors in the most likely state sequence, the class-specific method greatly outperformed the classic HMM approach which operated on a combined 7-dimensional feature set. The improved performance was due to the lower dimension of the feature spaces made possible by knowledge of the appropriate feature set for each state. It also outperformed a method that assumed the features were statistically independent. In this case, the improved performance comes from the fact that the class-specific approach does not compromise theoretical performance when reducing dimension.

In light of the above, it is therefore understood that within the scope of the appended claims, the invention may be practiced otherwise than as specifically described.

What is claimed is:

1. A method of training a class-specific hidden Markov model (NMM) used for modeling physical phenomena characterized by a finite number of states, said method comprising:

receiving training data forming an observation sequence;

formulating a common state from said training data wherein said common state includes all classes of said class-specific HMM;

estimating parameters of said class-specific HMM from said training data using a modified Baum-Welch algorithm, wherein said modified Baum-Welch algorithm uses likelihood ratios with respect to said common state and based on sufficient statistics for each of said states; and storing said parameters of said class-specific HMM for use in processing signals representing said physical phenomena.

2. The method of training a class-specific HMM of claim 1 wherein said step of estimating parameters of said class-specific HMM further includes the steps of:

calculating forward and backward probabilities; and updating said parameters of said class-specific HMM using reestimation formulas applied to said forward and backward probabilities.

3. The method of training a class-specific HMM of claim 2 wherein said step of estimating parameters of said class-specific HMM further includes the step of repeating the steps of calculating said forward and backward probabilities and updating said parameters of said class-specific HMM until convergence.

4. The method of training a class-specific HMM of claim 1 wherein said step of estimating parameters of said class-specific HMM further includes the step of conducting a plurality of iterations of said Baum-Welch algorithm, wherein each iteration of said Baum-Welch algorithm includes a class-specific forward procedure for calculating forward probabilities, a class-specific backward procedure for calculating backward probabilities, and HMM reestimation formulas for updating said parameters of said class-specific HMM based upon said forward probabilities and said backward probabilities.

5. The method of training a class-specific HMM of claim 4 wherein said class-specific HMM includes parameters $\lambda$, said parameters $\lambda$ including state prior probabilities $u_j$, a state transition matrix $A=\{a_{ij}\}$, and state observation probability density functions (PDP's) $b_j(s)$, where i and j range from 1 to N states.

6. The method of training a class-specific HMM of claim 5 wherein said class-specific forward procedure includes the following equations:

(a) Initialization:

$$\alpha_1^c(i) = u_i \frac{b_i^z(z_{i,1})}{b_{0,i}^z(z_{i,1})}, \quad 1 \leq i \leq N$$

(b) Induction:

$$\alpha_{t+1}^c(j) = \left[\sum_{i=1}^{N} \alpha_t^c(i) a_{ij}\right] \frac{b_j^z(z_{j,t+1})}{b_{0,j}^z(z_{j,t+1})}, \quad 1 \leq t \leq T-1, \ 1 \leq j \leq N$$

(c) Termination:

$$\frac{p(S|\lambda^z)}{p(S|H_0)} = \sum_{i=1}^{N} \alpha_T^c(i); \text{ and}$$

wherein said class-specific backward procedure includes the following equations:

(a) Initialization:

$$\beta_T^c(i) = 1$$

(b) Induction:

$$\beta_t^c(i) = \sum_{j=1}^{N} a_{ij} \frac{b_j^z(z_{j,t+1})}{b_{0,j}^z(z_{j,t+1})} \beta_{t+1}^c(j),$$

$t=T-1, T-2, \ldots 1 1 \leq i \leq N$ where z denotes a sufficient statistic;

S denotes the collection of all observations from t=1, . . . , T;

$H_0$ denotes the common state.

7. The method of training a class-specific HMM of claim 6 wherein said HMM re-estimation formulas include the following equations:

$$\gamma_t(j) = \frac{\alpha_t^c(j) \beta_t^c(j)}{\sum_{i=1}^{N} \alpha_t^c(i) \beta_t^c(j)}$$

-continued $$\xi_t(i,j) = \frac{\alpha_t^c(i) a_{ij} \frac{b_j^z(z_{j,t+1})}{b_{0,j}^z(z_{j,t+1})} \beta_{t+1}^c(j)}{\sum_{i=1}^{N} \sum_{m=1}^{N} \alpha_t^c(i) a_{im} \frac{b_m^z(z_{m,t+1})}{b_{0,m}^z(z_{m,t+1})} \beta_{t+1}^c(m)}$$

wherein the updated state priors are $$\hat{u}_i = \gamma_1(i)$$

and the updated state transition matrix is $$\hat{a}_{ij} = \frac{\sum_{t=1}^{T-1} \xi_t(i,j)}{\sum_{t=1}^{T-1} \gamma_t(i)}.$$

8. The method of training a class-specific HMM of claim 4 wherein each iteration of said Baum-Welch algorithm further includes Gaussian mixture reestimation formulas.

9. The method of training a class-specific HMM of claim 7 wherein each iteration of said Baum-Welch algorithm further includes Gaussian mixture reestimation formulas including the following equations:

$$\gamma_t^c(j,m) = \gamma_t(j) \left[ \frac{c_{jm} N(z_{j,t}, \mu_{jm}^z, U_{jm}^z)}{b_j^z(z_{j,t})} \right]$$

$$\hat{c}_{jm}^z = \frac{\sum_{t=1}^{T} \gamma_t^c(j,m)}{\sum_{t=1}^{T} \sum_{l=1}^{M} \gamma_t^c(j,l)},$$

-continued $$\hat{\mu}_{jm}^z = \frac{\sum_{t=1}^{T} \gamma_t^c(j,m) z_{j,t}}{\sum_{t=1}^{T} \gamma_t^c(j,m)}$$

and $$\hat{U}_{jm}^z = \frac{\sum_{t=1}^{T} \gamma_t^c(j,m)(z_{j,t} - \mu_{jm}^z)(z_{j,t} - \mu_{jm}^z)'}{\sum_{t=1}^{T} \gamma_t^c(j,m)}.$$

10. The method of training a class-specific HMM of claim 1 wherein said HMM is used in speech processing and said physical phenomena includes modes of speech, and wherein said common state is a white noise state.

11. A system for training a class-specific hidden Markov model (HMM) used for modeling physical phenomena characterized by a finite number of states, said system comprising:

means for receiving training data represented as an observation sequence;

means for formulating a common state from said training data wherein said common state includes all classes of said class-specific HMM;

means for estimating parameters of said class-specific HMM from said training data using a modified Baum-Welch algorithm, wherein said modified Baum-Welch algorithm uses likelihood ratios with respect to said common state and based on sufficient statistics for each of said states; and means for storing said parameters of said class-specific HMM for use in processing signals representing said physical phenomena.

* * * * *